US012655670B2

(12) United States Patent
Holzapfel

(10) Patent No.: US 12,655,670 B2
(45) Date of Patent: Jun. 16, 2026

(54) HINGE

(71) Applicant: Julius Blum GmbH, Hoechst (AT)

(72) Inventor: Andreas Holzapfel, Bregenz (AT)

(73) Assignee: JULIUS BLUM GMBH, Hoechst (AT)

( * ) Notice: Subject to any disclaimer, the term of this patent is extended or adjusted under 35 U.S.C. 154(b) by 11 days.

(21) Appl. No.: 18/739,952

(22) Filed: Jun. 11, 2024

(65) Prior Publication Data

US 2024/0328227 A1 Oct. 3, 2024

Related U.S. Application Data

(63) Continuation of application No. PCT/EP2022/084579, filed on Dec. 6, 2022.

(30) Foreign Application Priority Data

Dec. 14, 2021 (EP) .................................... 21214287

(51) Int. Cl.
*E05F 1/08* (2006.01)
*E05D 5/02* (2006.01)
(Continued)

(52) U.S. Cl.
CPC ............ *E05F 5/006* (2013.01); *E05D 5/0276* (2013.01); *E05F 5/02* (2013.01); *E05Y 2201/11* (2013.01);
(Continued)

(58) Field of Classification Search
CPC ........... E05Y 2900/20; E05Y 2900/202; E05Y 2900/204; E05Y 2900/208; E05Y 2201/11;
(Continued)

(56) References Cited

U.S. PATENT DOCUMENTS 7,395,580 B2 * 7/2008 Brustle .................. E05F 5/006 16/50
7,600,295 B2 10/2009 Zimmer
(Continued)

FOREIGN PATENT DOCUMENTS

CN 103306561 A * 9/2013 ............. E05F 5/006
DE 203 20 810 5/2005
(Continued)

OTHER PUBLICATIONS

International Search Report issued Mar. 1, 2023 in International (PCT) Application No. PCT/EP2022/084579.

*Primary Examiner* — Chuck Y Mah
(74) *Attorney, Agent, or Firm* — Wenderoth, Lind & Ponack, L.L.P.

(57) ABSTRACT

A hinge includes a stop part to secure the hinge to a stationary furniture part; an articulated lever; and a hinge cup pivotally arranged on the stop part via the articulated lever. The articulated lever with the hinge cup is mounted via an articulated axle, and the hinge cup can be secured to a movable furniture part. A damping device dampens a relative movement between the stop part and the hinge cup between an open position and a closed position of the hinge. The damping device has a linear damper including a piston and a piston rod, and is arranged outside of the hinge cup. An actuation element separate from the articulated lever actuates the damping device. The actuation element is rotatably mounted on the hinge cup, and the piston rod is movable in a substantially translational manner relative to the linear damper by a rotation of the actuation element.

28 Claims, 7 Drawing Sheets

(51) Int. Cl.
*E05F 5/00* (2017.01)
*E05F 5/02* (2006.01)

(52) U.S. Cl.
CPC ... *E05Y 2201/232* (2013.01); *E05Y 2201/626* (2013.01); *E05Y 2201/682* (2013.01)

(58) Field of Classification Search
CPC ............. E05Y 2201/20; E05Y 2201/21; E05Y 2201/214; E05Y 2201/216; E05Y 2201/232; E05Y 2201/256; E05Y 2201/264; E05Y 2201/266; E05Y 2201/626; E05Y 2600/12; E05Y 16/54; E05Y 16/281; E05Y 16/284; E05Y 16/286; E05F 3/20; E05F 3/108; E05F 5/006; E05F 5/02; E05F 5/0276; E05F 5/10; E05D 11/1021; E05D 11/1042; E05D 11/105; E05D 11/1064; E05D 5/065; E05D 7/04; E05D 7/0407; E05D 7/123; E05D 7/125; E05D 3/142
See application file for complete search history.

(56) References Cited

U.S. PATENT DOCUMENTS

| | | | | |
|---|---|---|---|---|
| 7,748,082 | B2 * | 7/2010 | Harald | E05F 5/006 16/280 |
| 8,424,161 | B2 | 4/2013 | Sutterlütti | |
| 9,945,169 | B2 | 4/2018 | Kruedener et al. | |
| 10,808,442 | B2 | 10/2020 | Salice | |
| 2003/0200625 | A1 | 10/2003 | Zimmer | |
| 2011/0225768 | A1 | 9/2011 | Haemmerle | |
| 2011/0291538 | A1 | 12/2011 | Brunnmayr | |
| 2011/0298349 | A1 | 12/2011 | Sutterlütti | |
| 2014/0331451 | A1 | 11/2014 | Holzapfel | |
| 2015/0218863 | A1 * | 8/2015 | Cooper | E05F 5/02 16/235 |
| 2017/0081890 | A1 * | 3/2017 | Buschmann | E05F 5/006 |
| 2017/0096849 | A1 | 4/2017 | Kruedener et al. | |
| 2017/0350179 | A1 | 12/2017 | Salice | |
| 2020/0318411 | A1 * | 10/2020 | Pecar | E05F 3/20 |
| 2021/0277698 | A1 * | 9/2021 | Capur | E05F 5/006 |
| 2024/0125160 | A1 * | 4/2024 | Valter | E05F 5/006 |

FOREIGN PATENT DOCUMENTS

| | | | | |
|---|---|---|---|---|
| DE | 20 2013 008 364 | | 11/2013 | |
| DE | 20 2015 105 233 | | 2/2017 | |
| EP | 2060719 | A2 * | 5/2009 | E05F 5/006 |
| EP | 1 359 275 | | 8/2012 | |
| EP | 2 411 612 | | 9/2018 | |
| JP | 2012-521500 | | 9/2012 | |
| JP | 2015-510560 | | 4/2015 | |
| JP | 2018-504537 | | 2/2018 | |
| KR | 10-2009-0061640 | | 6/2009 | |
| KR | 10-1578258 | | 12/2015 | |
| KR | 10-1685719 | | 12/2016 | |
| WO | 2004/020771 | | 3/2004 | |
| WO | WO-2009105794 | A1 * | 9/2009 | E05F 5/02 |
| WO | 2016/102215 | | 6/2016 | |
| WO | 2020/169300 | | 8/2020 | |

* cited by examiner

HINGE

The present application is a continuation of International Application PCT/EP2022/084579 filed on Dec. 6, 2022. Thus, all of the subject matter of International Application PCT/EP2022/084579 is incorporated herein by reference.

BACKGROUND OF THE INVENTION

The invention relates to a hinge, in particular a furniture hinge, comprising an attachment part with which the hinge can be fastened to a stationary furniture part, at least one articulated lever, a hinge cup which is or can be pivotably arranged on the attachment part via the at least one articulated lever. The at least one articulated lever with the hinge cup is mounted via at least one hinge pin, and the hinge cup can be fastened to a movable furniture part. At least one damping device is provided for damping a relative movement between the attachment part and the hinge cup between an open position and a closed position of the hinge, and the at least one damping device has a linear damper with a piston and a translationally movable piston rod. The at least one damping device is arranged, preferably completely, outside the hinge cup, and at least one actuating element, which is preferably one-piece and/or separate from the at least one articulated lever, particularly preferably spatially at least in the open position, for actuating the at least one damping device. The invention also relates to a piece of furniture with at least one such hinge.

Such a hinge is already known from the document WO 2016/102215 A1, in which a linear damper with a linearly movable slide can be fastened to the outside of a hinge cup, wherein the articulated lever contacts the linearly movable slide through a hinge cup opening in order to actuate the linear damper.

A disadvantage of the state of the art is that the translation of the rotational movement of the articulated lever into a translational movement of the linearly movable slide causes an anharmonic damping stroke. A force distribution on the linearly movable slide is also unfavorable, as a force vector induced by the rotation of the articulated lever points orthogonally to the piston rod, as a result of which a high wear of the linearly movable slide and/or a reduced force transmission to the linear damper is in particular obtained. In addition, the complex geometry of the linearly movable slide has to be adapted to the course of movement of the articulated lever in an elaborate manner and with low tolerances, in order to be able to guarantee the functionality of the hinge.

SUMMARY OF THE INVENTION

The objective technical problem of the present invention is therefore to specify a hinge that is improved compared with the state of the art in which the disadvantages of the state of the art are at least partially remedied. In particular, the hinge has a compact design and/or a particularly beneficial transfer of a rotational movement of at least one articulated lever to the piston rod, in order to be able to guarantee in particular a harmonic damping movement.

Accordingly, the at least one actuating element is mounted rotatably on the hinge cup, preferably on the outside thereof, and the piston rod can be moved substantially translationally with respect to the linear damper, preferably directly, by a rotation of the at least one actuating element.

This makes it possible first of all that a limited installation space inside the hinge cup is substantially independent of the structural design of the damping device and/or is not further limited by the damping device, wherein a particularly compact hinge is provided.

The hinge can also be flexibly adapted to altered damping devices—for example of varying geometries and/or dimensions.

Added to this is the positive property that the rotational movement of the at least one articulated lever generated in the interior space of the hinge cup can be converted into a rotational movement of the at least one actuating element. This results in the advantage on the one hand that a translation of the rotational movement of the articulated lever into the rotational movement of the at least one actuating element can be adapted depending on requirements placed on the hinge (for example, via a positioning of a point of application of the at least one articulated lever on the at least one actuating element and/or via a point of application of the piston rod on the at least one actuating element), and on the other hand that simple kinematics are provided, with which a rotational movement inside the hinge cup can be transferred into an outer area of the hinge cup. In particular, an installation of the hinge per se and/or of the hinge on the movable furniture part can be effected in a particularly user-friendly manner.

In general, it is possible for the at least one articulated lever to contact the piston rod, preferably directly, for example by reaching through a hinge cup opening.

The actuation of the at least one damping device is preferably effected exclusively translationally. In general, a linear movement of the piston rod with respect to the linear damper can be overlapped with a pivoting movement of the at least one damping device. A pivoting movement can for example be inhibited or prevented via inclined surfaces on the hinge cup and/or a hinge cup cover.

Through a movement coupling—in particular at least in portions or exclusively in portions—of the at least one articulated lever to the at least one actuating element, a rotational movement of the articulated lever is preferably translated into a linear movement of the piston rod by, preferably direct, contacting of the at least one actuating element with the piston rod.

The at least one actuating element is preferably spaced apart from the at least one articulated lever and/or contacts the piston rod of the linear damper directly in at least one movement portion.

As stated at the beginning, protection is also sought for a piece of furniture, comprising at least one stationary furniture part and a movably mounted furniture part, with at least one such hinge, wherein the attachment part of the hinge is arranged on the stationary furniture part and the hinge cup is arranged on the movable furniture part, in particular integrated at least in areas in the movable furniture part.

The hinge is preferably used in furniture carcasses with flaps. The hinge can, however, in general also be used in windows/window frames, doors/door frames or the like.

It is particularly preferable that the at least one actuating element be arranged on the hinge cup, with some areas inside and some areas outside the hinge cup, and/or the at least one articulated lever be arranged with some areas inside and some areas outside the hinge cup.

A force transmission from an interior space of the hinge cup can thereby be conveyed into an exterior space of the hinge cup in a particularly beneficial manner.

According to an advantageous design of the invention, a hinge cup cover is provided, with which the at least one damping device and/or the at least one actuating element can be covered at least in areas, preferably completely. Preferably, the hinge cup cover can be or is clipped onto the hinge cup and/or comprises at least one receiving area, preferably corresponding to the geometry of the at least one damping device and/or of the at least one actuating element.

The hinge cup cover can reduce contamination of the at least one damping device and/or the at least one actuating element, in order to be able to maintain the proper functionality of the hinge over a longer service life. For example, in the use position of the hinge, chippings can be prevented from reaching component parts arranged on the outside of the hinge cup, such as actuating element or damping device, and/or from entering an interior space of the hinge cup.

If the at least one damping device and/or the at least one actuating element are already preinstalled on the outside of the hinge cup, work steps in the final installation can be reduced.

The hinge cup and/or the attachment element preferably comprises at least one fastening portion, with which the hinge cup and/or the attachment element can be fixed on a furniture part via fastening means.

The hinge cup particularly preferably comprises an inclined surface or sloping plane oriented relative to a hinge cup base, on which the at least one damping device can be supported.

The linear damper can comprise a return spring and/or can be movement-coupled to the at least one actuating element in such a way (for example via a positive locking) that, after damping has been effected, a return to a starting position before the damping is automatically generated.

Advantageously, in the closed position and/or the open position of the hinge, at least areas of the at least one articulated lever are arranged inside the hinge cup in an interior space of the hinge cup and/or an exterior space of the hinge cup is separated from the interior space of the hinge cup by a hinge cup wall that is preferably separate from an optionally present hinge cup cover and/or spaced apart at least in areas from an optionally present hinge cup cover.

It has proved to be beneficial that the hinge cup comprises a cutout, a hinge cup base and/or a support surface, wherein the at least one damping device is arranged at least in areas in the cutout of the hinge cup and/or on the support surface of the hinge cup, wherein it is preferably provided that the support surface forms a particularly preferably acute angle with respect to the hinge cup base.

The cutout can result in a more beneficial mounting of the at least one damping device and/or the at least one actuating element, wherein the support surface can support the at least one damping device against an undesired pivoting movement within the meaning of a support.

According to an advantageous embodiment of the invention, the at least one actuating element projects through a hinge cup opening into the hinge cup and/or the at least one articulated lever projects through the hinge cup opening out of the hinge cup.

This makes a force transmission from the interior space of the hinge cup into the exterior space of the hinge cup possible. The at least one actuating element is particularly preferably arranged laterally on the outside of the hinge cup.

It has proved to be advantageous that the at least one actuating element is mounted on the hinge cup rotatable about a pivot pin, preferably the at least one hinge pin. A rotational movement of the at least one actuating element can be converted into a linear movement of the piston rod of the linear damper, and the at least one actuating element comprises a control curve and/or a particularly preferably convex profiling in the direction of the piston of the linear damper.

The control curve and/or the profiling is preferably formed convex in the direction of the piston rod, in order to be able to guarantee a particularly harmonic damping movement.

An advantageous variant of the present invention is that the at least one actuating element is formed as a sheet metal part or plastic part, preferably substantially bent into a U-shape.

If the at least one actuating element is designed in a U-shape, a support on the hinge cup and/or a contacting with the piston rod can be obtained in a particularly beneficial manner.

In an embodiment of the invention, at least one transmission mechanism is provided, with which a rotational movement of the at least one articulated lever can be transferred to the at least one actuating element. Preferably, the at least one transmission mechanism is arranged inside the hinge cup.

Through the at least one transmission device, an actuation, exclusively in portions, of the linear damper via the at least one actuating element can be generated. The at least one transmission device is preferably formed corresponding to at least areas of a geometry of the at least one actuating element in order to contact the at least one actuating element. For example, the at least one transmission device can comprise a control disk and/or a receiver of the at least one articulated lever for the at least one actuating element.

According to a preferred embodiment of the invention, in a first movement portion starting from the open position of the hinge in the direction of the closed position of the hinge, the at least one transmission mechanism is formed contactless relative to the at least one actuating element and/or, in a second movement portion, preferably following the first movement portion, is in contact with the at least one actuating element. Preferably, the at least one damping device can be activated by the at least one transmission mechanism, preferably exclusively, in the second movement portion.

This guarantees that the damping of the hinge is effected from a particular angle of the at least one articulated lever or exclusively in one movement portion. In the second movement portion, the at least one articulated lever reaches an angle at which the at least one transmission device preferably contacts the at least one actuating element in order to activate the damping. In general the transmission device can be dispensed with and the at least one actuating element can be comprised by the at least one articulated lever, in order to actuate the piston rod directly.

The damping of the hinge is preferably effected starting from the open position in the direction of the closed position. In general, a damping of the hinge can alternatively or additionally be effected starting from the closed position into the open position—in particular with the two movement portions.

Furthermore, preferably the at least one transmission mechanism is arranged rotatable on a pivot pin, preferably the at least one hinge pin, and/or is formed as a, preferably integral, part of the at least one articulated lever.

For example, the at least one transmission mechanism can be arranged at a free end of the at least one articulated lever and/or (in the sense of a dual function) can be mounted about the pivot pin.

In a further embodiment, the at least one transmission mechanism comprises a control curve and/or a profiling, preferably designed as an undercut, for receiving the at least one actuating element.

A movement coupling, preferably in portions, to the at least one actuating element is thereby possible in a particularly beneficial manner, wherein the control curve and/or profiling can be adapted to a desired damping stroke.

According to an advantageous design of the invention, the at least one articulated lever comprises the at least one transmission mechanism and/or can be or is arranged on the at least one actuating element indirectly via the at least one transmission mechanism, preferably through a rotational movement of the at least one articulated lever.

According to an advantageous design of the invention, the at least one actuating element is arranged predominantly outside the hinge cup and/or comprises a coupling mechanism with which the at least one transmission mechanism can be contacted for damping the hinge.

Via the coupling mechanism, the rotational movement of the at least one articulated lever can be transferred to the at least one actuating element, wherein, through the rotational movement of the at least one actuating element initiated thereby, an actuation of the linear damper is effected.

It is advantageously provided that the coupling mechanism is formed in the form of a bar, preferably oriented substantially parallel to the at least one hinge pin, wherein the bar protrudes transversely from the at least one actuating element.

A bar can project through the hinge cup in a particularly beneficial manner, wherein the hinge cup can be designed closed to a large extent.

According to an advantageous embodiment of the invention, the coupling mechanism projects through an elongated hole, preferably present in the form of an annular segment, into the hinge cup, and preferably the coupling mechanism has a free end.

The elongated hole can make it possible to transfer a rotational movement. The elongated hole, through an extension, can for example define a stop as a limit for a damping stroke of the linear damper.

An advantageous variant of the present invention is that the at least one actuating element is connected to the piston rod, preferably via an extension rod arranged transverse and/or orthogonal to the piston rod. Preferably, at least areas of the piston rod are arranged inside an opening or indentation in the at least one actuating element for the movement coupling of the piston rod to the at least one actuating element.

The opening or indentation is preferably spaced apart from the pivot pin, wherein a translation of the rotational movement of the at least one articulated lever into a linear movement of the piston rod can be adjusted via varying spacings from the pivot pin, as different torques are transmitted to the linear damper.

Through the connection of the at least one actuating element to the extension rod via the opening or indentation, a particularly secure connection can be guaranteed, wherein an undesired slipping of the piston rod relative to the at least one actuating element is effectively prevented.

It is particularly preferable that the at least one hinge pin is formed in the form of a rivet connected to the hinge cup and/or a clip connected to the hinge cup, wherein it is preferably provided that the clip forms a further hinge pin for a further articulated lever.

BRIEF DESCRIPTION OF THE DRAWINGS

Further details and advantages of the present invention are explained in more detail below with the aid of the description of the embodiments represented in the drawings, in which.

DETAILED DESCRIPTION OF THE INVENTION

Figure 1A:
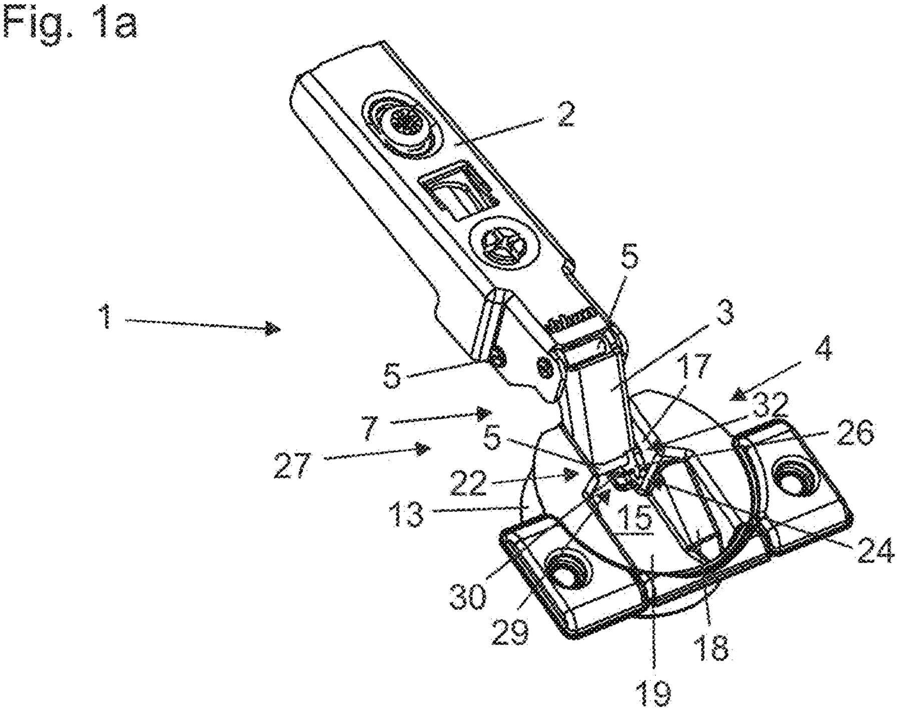
FIGS. 1*a*-1*b* show a hinge according to a particularly preferred embodiment in a perspective view and an exploded representation.

FIG. 1*a* shows a hinge 1 in the form of a furniture hinge, comprising an attachment part 2 with which the hinge 1 can be fastened to a stationary furniture part 40 (see FIG. 7), two articulated levers 3, wherein a first articulated lever 3 conceals a further articulated lever 39 in the representation, and a hinge cup 4 which is pivotably arranged on the attachment part 2 via the two articulated levers 3. In general, only one articulated lever 3 can also be provided. The articulated lever 3 (and the further articulated lever 39) with the hinge cup 4 is mounted via hinge pins 5, wherein the hinge cup 4 can be fastened to a movable furniture part 41.

Figure 1B:
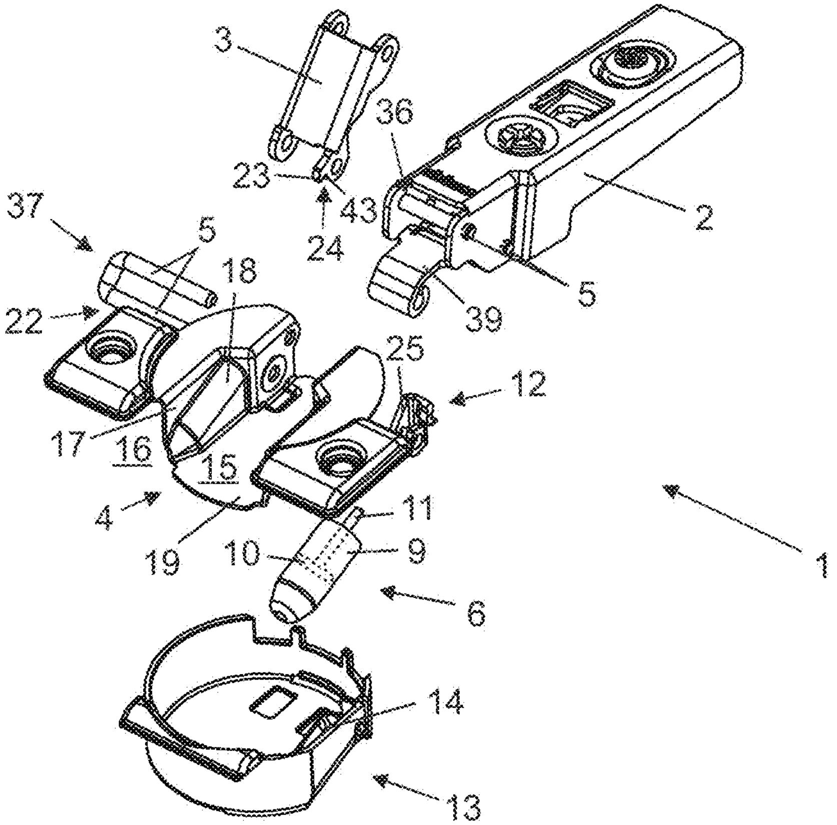

FIG. 1*b* shows an exploded representation of the component parts involved on the hinge 1, wherein the one actuating element 12 is formed as a sheet metal part 25 bent into a U-shape. The actuating element 12 can, however, in general (for example in the embodiment according to FIG. 5*a*) be formed as a plastic part.

The hinge 1 comprises a damping device 6 for damping a relative movement between the attachment part 2 and the hinge cup 4 between an open position 7 (e.g., FIG. 3*a*) and a closed position 8 (e.g., FIG. 4*b*) of the hinge 1, which is arranged laterally on the outside of the hinge cup 4. The damping device 6 has a linear damper 9 with a piston 10 and a piston rod 11 that is translationally movable with respect to the linear damper 9, wherein the piston rod 11 is connected to the piston 10 for damping the hinge 1. The hinge pin 5 which is more relevant for the transfer of the damping movement is illustrated as pivot pin 22 in the figures. In general, a further damping device 6 can also be provided, which is arranged on the hinge cup 4 symmetrical or mirrored, for example, about a longitudinal extent of the hinge 1.

The hinge 1 comprises an actuating element 12, which is formed in one piece and separate, for actuating the at least one damping device 6, and is spaced apart from the articulated lever 3 in the open position 7 and contacts the articulated lever 3 in the closed position 8. The damping device 6 is arranged completely outside the hinge cup 4.

Figure 2A:
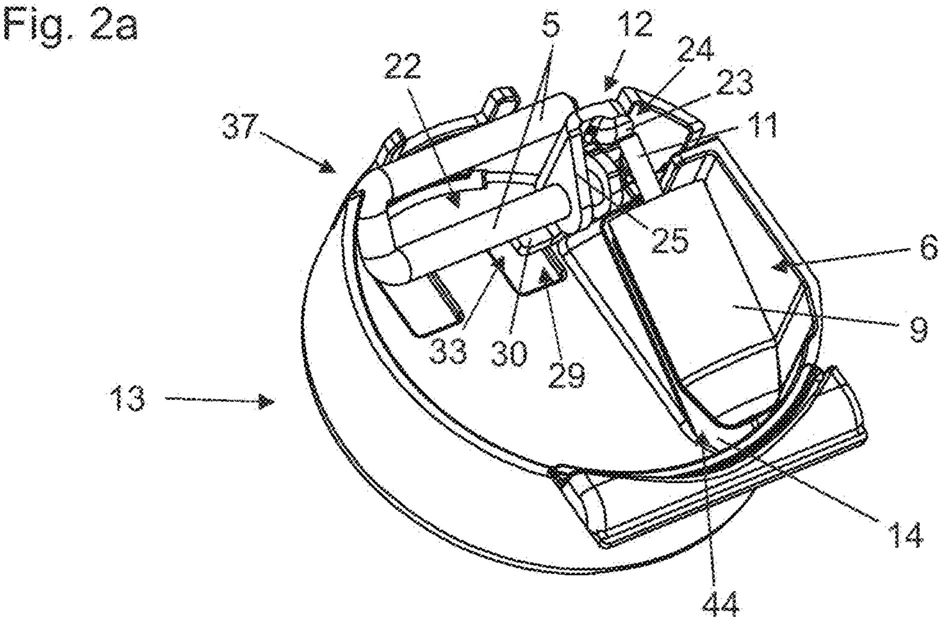
FIGS. 2*a*-2*c* show component parts of the hinge according to the embodiment according to FIG. 1*a* in a perspective view, a sectional representation and a view from the side.
Figure 2B:
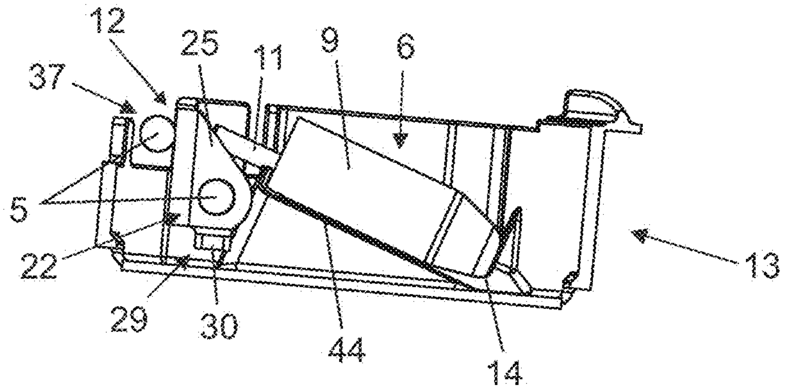

FIG. 2*a* shows the arrangement of the damping device 6 and of the actuating element 12 relative to a hinge cup cover 13 with which the damping device 6 and the actuating element 12 can be covered. The hinge cup cover 13 has fastening means, with which the hinge cup cover 13 can be clipped onto the hinge cup 4, on a lateral surface facing the articulated lever 3, wherein a receiving area 14 is provided, which is designed corresponding to the geometry of the damping device 6 and of the actuating element 12.

Figure 2C:
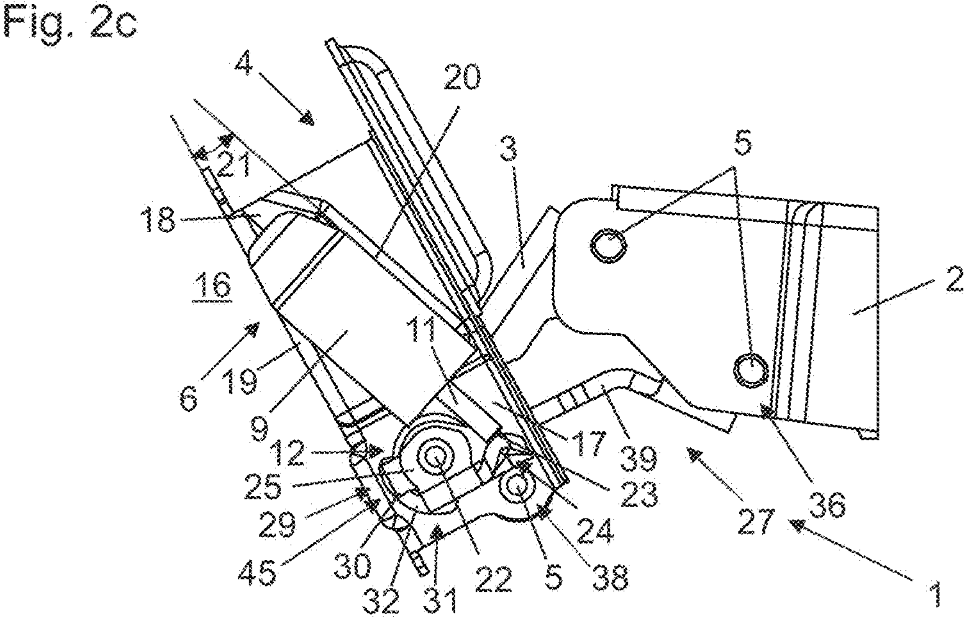

FIG. 2*c* shows the hinge 1 without the hinge cup cover 13, wherein the hinge cup 4 comprises a cutout 18, a hinge cup base 19, and a support surface 20. The damping device 6 is arranged in the cutout 18 of the hinge cup 4 and on the support surface 20 of the hinge cup 4. The support surface 20 forms an acute angle 21 with respect to the hinge cup base 19.

FIG. 2*c* shows the hinge 1 without the hinge cup cover 13, wherein the hinge cup 4 comprises a cutout 18, a hinge cup base 19 and a support surface 20, wherein the damping device 6 is arranged in the cutout 18 of the hinge cup 4 and on the support surface 20 of the hinge cup 4. The support surface 20 forms an acute angle 21 with respect to the hinge cup base 19.

The support surface 20 can be oriented parallel to the further support surface 44 of the hinge cup cover 13, with the result that the damping device 6 has a tight fit on the hinge cup 4, or can be arranged relative to the further support surface 44 in such a way that a slight rotational movement of the damping device 6 is made possible, which overlaps with a translational movement of the piston rod 11. In general, the support surface 20 or the further support surface 44 is, however, not absolutely necessary.

The actuating element 12 projects through a hinge cup opening 45 into the hinge cup 4. In general, the actuating element 12 can also be arranged exclusively outside the hinge cup 4, and the articulated lever 3 can project through the hinge cup opening 45 out of the hinge cup 4, wherein the articulated lever 3 is arranged with some areas inside and some areas outside the hinge cup 4. In general, it is also conceivable that the actuating element 12 is formed by the articulated lever 3 and transfers the rotational movement directly to the piston rod 11 of the damping device 6.

The rotational movement of the actuating element 12 is felt on the profiling 24 by the piston rod 11, wherein a translation can be altered by an altered spacing of the profiling 24 from the pivot pin 22.

The rotational movement of the articulated lever 3 is felt on the coupling mechanism 29 by the actuating element 12. A translation can be altered by an altered spacing of the coupling mechanism 29 from the pivot pin 22 (or the positioning of the transmission mechanism 26 on the articulated lever 3).

The sensing of the rotational movement is preferably effected at a free end of the articulated lever 3 and/or of the actuating element 12.

Figure 3A:
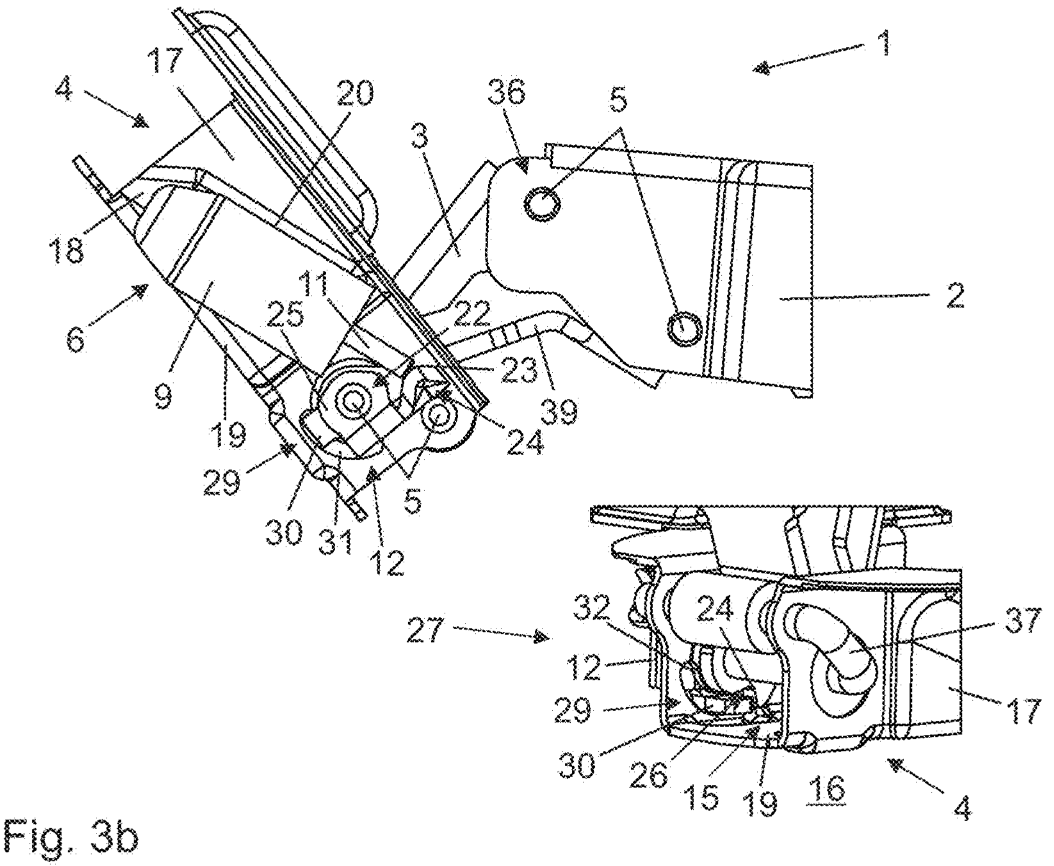
FIGS. 3*a*-4*b* show the hinge according to the embodiment according to FIG. 1*a* without a hinge cup cover in different positions between an open position and a closed position of the hinge, in each case in a view from the side and a perspective view.

FIG. 3*a* shows that the actuating element 12 is arranged on the hinge cup 4, with some areas inside and some areas outside the hinge cup 4.

The actuating element 12 is mounted on the outside of the hinge cup 4 rotatable via the hinge pin 5 in the form of the pivot pin 22 (formed by a clip 37). The piston rod 11 can be moved translationally with respect to the linear damper 9 (optionally with a slight pivoting movement of the piston rod 11 and of the linear damper 9) directly by a rotation of the actuating element 12.

The hinge 1 comprises a transmission mechanism 26 with which a rotational movement of the articulated lever 3 can be transferred to the actuating element 12. In this embodiment, the transmission mechanism is arranged inside the hinge cup 4.

In a first movement portion 27 (i.e., a first portion of the movement of the hinge 1) starting from the open position 7 of the hinge 1 in the direction of the closed position 8 of the hinge 1, the transmission mechanism 26 is formed contactless relative to the actuating element 12 (the transmission mechanism 26 does not contact the actuating element 12), and the hinge 1 is in the first movement portion 27 in the state shown in FIG. 3*a*. In a second movement portion 28 following the first movement portion 27 in the direction of the closed position 8 of the hinge 1, the transmission mechanism 26 is in contact with the actuating element 12 (see FIG. 3*b*).

The transmission mechanism 26 comprises a control curve 23 and a profiling 24, present in the form of an undercut 43, for receiving the actuating element 12.

Figure 3B:
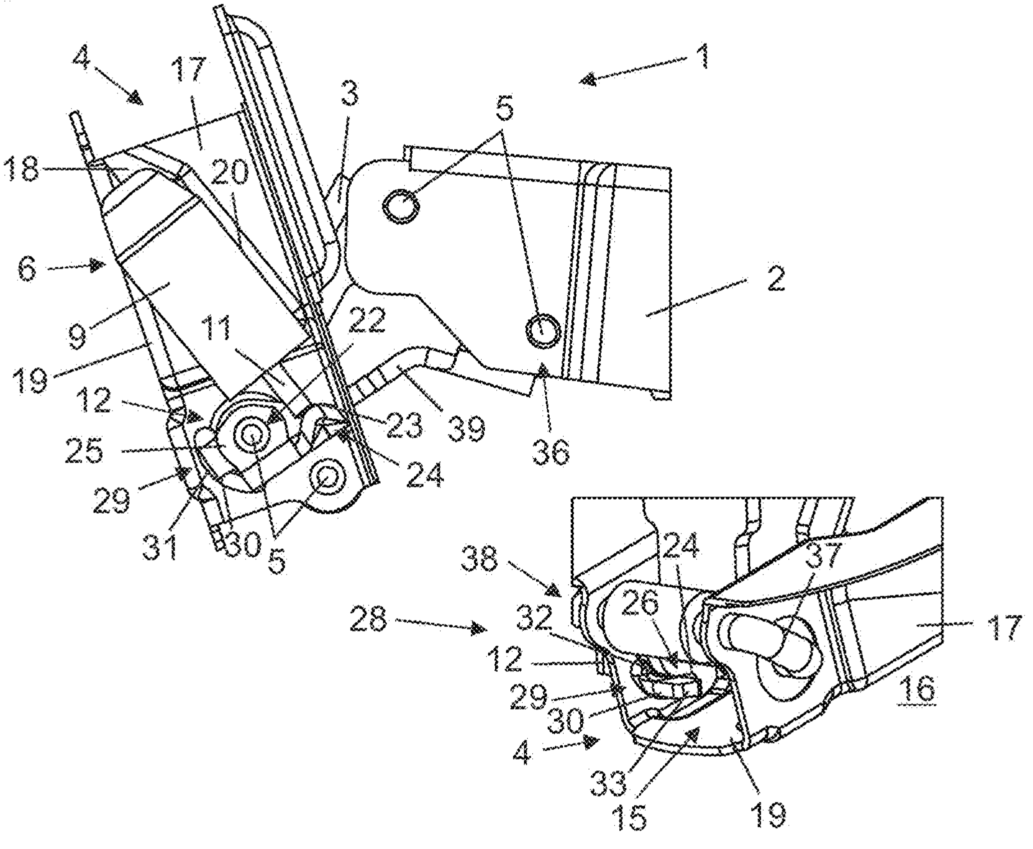

FIG. 3*b* shows the hinge 1 at the beginning of the second movement portion 28, wherein the damping device 6 is active exclusively in the second movement portion 28 through the transmission mechanism 26.

In the closed position 8 and the open position 7 of the hinge 1, areas of the articulated lever 3 are arranged inside the hinge cup 4 in an interior space 15 of the hinge cup 4. An exterior space 16 of the hinge cup 4 is separated from the interior space 15 of the hinge cup 4 by a hinge cup wall 17 that is separate from the hinge cup cover 13 and spaced apart in areas from the hinge cup cover 13.

Figure 4A:
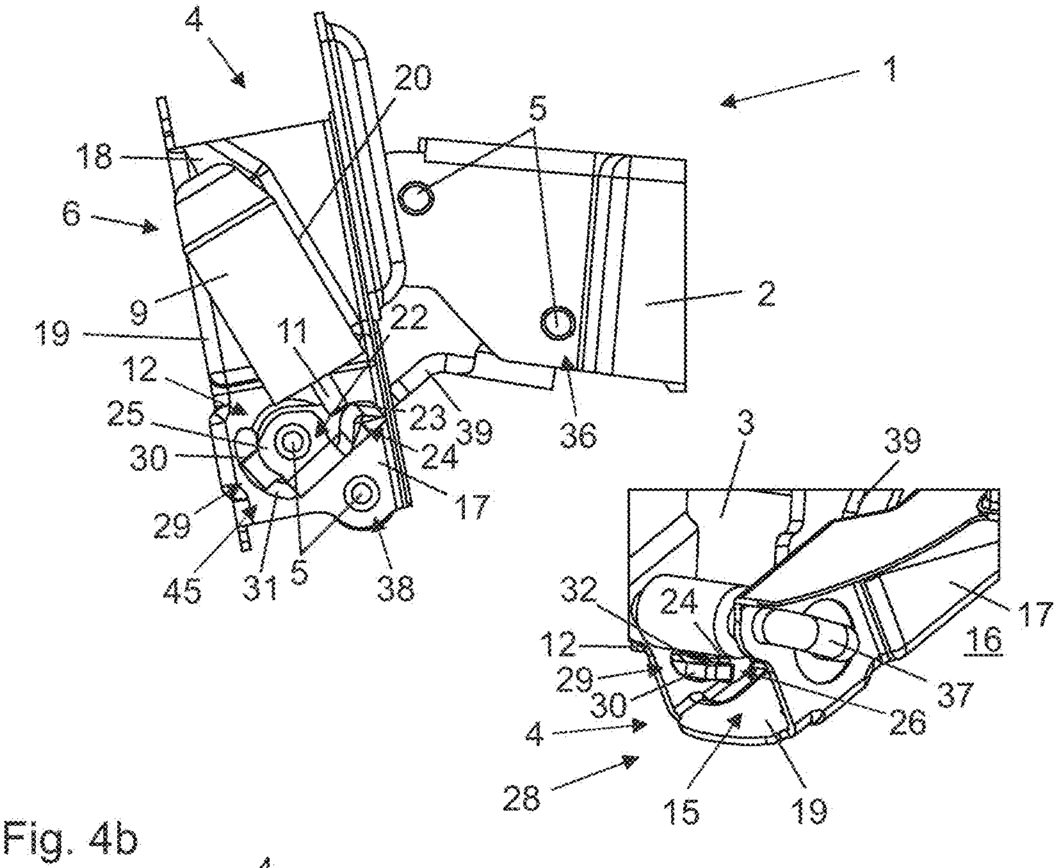

FIG. 4*a* shows that the actuating element 12 is mounted on the hinge cup 4 rotatable about the pivot pin 22 in the form of one of the hinge pins 5. The rotational movement of the actuating element 12 can be translated into a linear movement of the piston rod 11 of the linear damper 9. The actuating element 12 comprises a control curve 23 formed convex in the direction of the piston rod 11 and a profiling 24 formed convex in the direction of the piston 10 of the linear damper 9.

The transmission mechanism 26 positioned rotatable on the pivot pin 22 is formed as part of the articulated lever 3 connected in a material-bonding manner and is thus an integral part of the articulated lever 3. In general, the transmission mechanism 26 can, however, also be formed as a separate component part of the hinge 1 or indirectly interact with the articulated lever 3.

In the course of a closing movement of the hinge 1, in the first movement portion 27 the articulated lever 3 rotates about the hinge pin 5 until the transmission mechanism 26 contacts the actuating element 12 and during the second movement portion 28 the actuating element 12 also rotates in a movement-coupled manner, in order to initiate a damping via the piston rod 11. In general, this movement coupling for damping the hinge 1 is alternatively or additionally also possible in the course of an opening movement of the hinge 1.

The actuating element 12 is arranged predominantly outside the hinge cup 4 (in the exterior space 16 thereof) and projects into the interior space 15 of the hinge cup 4. The actuating element 12 comprises a coupling mechanism 29 with which the transmission mechanism 26 can be contacted for damping the hinge 1.

The coupling mechanism 29 is formed in the form of a bar 30 oriented parallel to the hinge pins 5, wherein the bar 30 protrudes transversely from the actuating element 12.

The coupling mechanism 29 projects through an elongated hole 32 as hinge cup opening 45, present in the form of an annular segment 31, into the hinge cup 4. The coupling mechanism 29 has a free end 33.

Figure 4B:
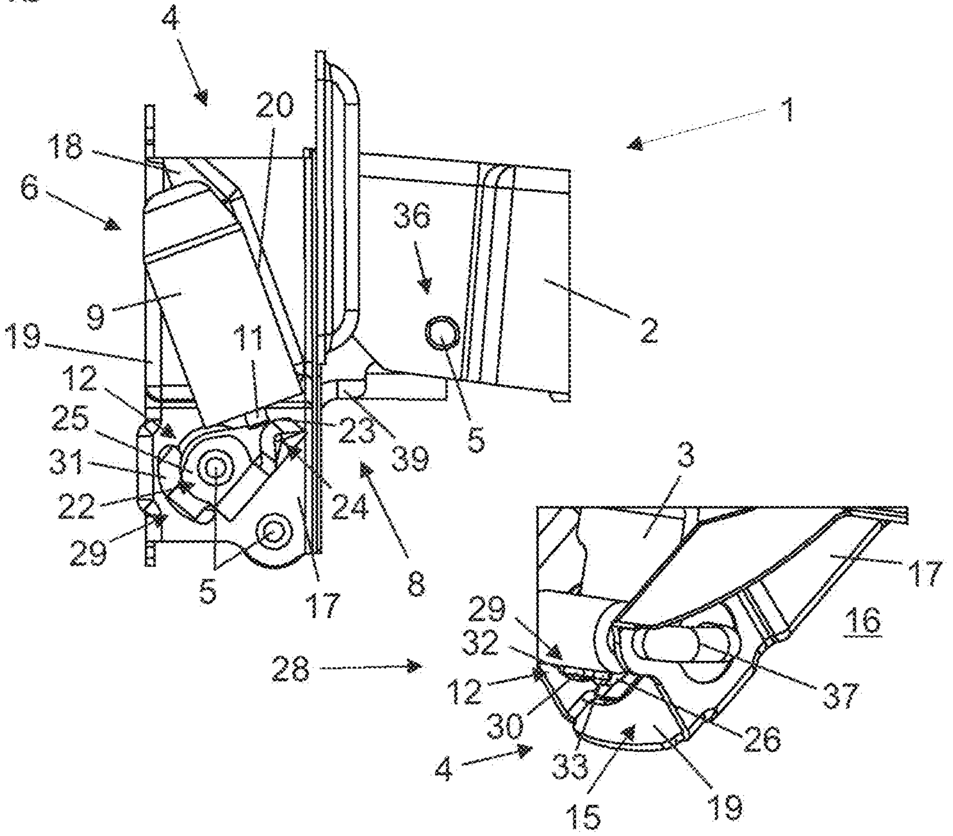

FIG. 4*b* differs from FIG. 4*a* merely to the effect that the hinge 1 is in the closed position 8. The damping stroke of the damping device 6 is complete, wherein in general a return of the damping device 6 to a starting position of the damping device 6 can be effected by a return spring or via a movement coupling to the actuating element 12.

Figure 5A:
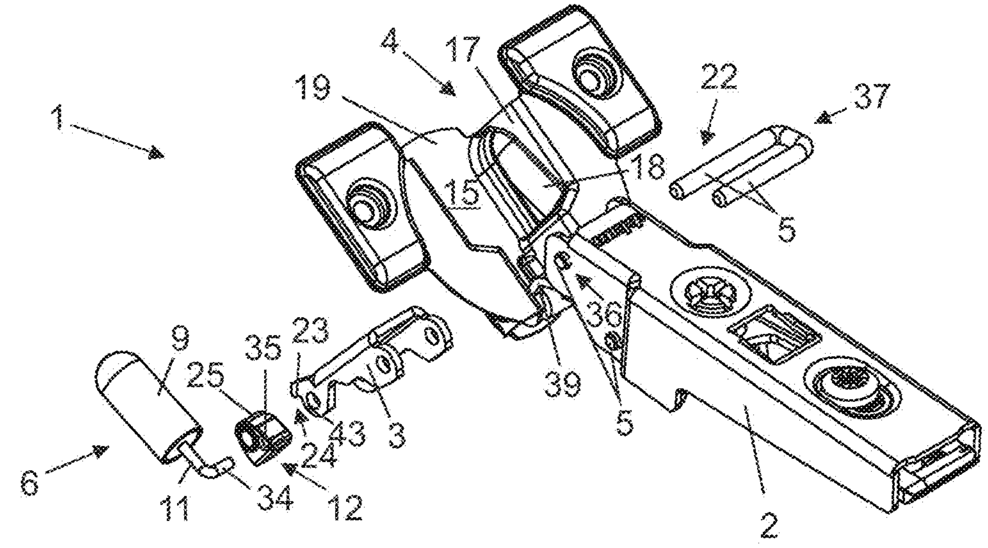
FIGS. 5*a*-5*b* show a hinge according to a further particularly preferred embodiment in an exploded representation and in a view from the side with enlarged detail sections in side view and perspective view.

FIG. 5*a* shows a further preferred embodiment of the hinge 1 in an exploded representation, wherein the actuating element 12 is connected to the piston rod 11 via an extension rod 34 arranged orthogonal to the piston rod 11. Areas of the extension rod 34 of the piston rod 11 are arranged inside an opening 35 in the actuating element 12 for the movement coupling of the piston rod 11 to the actuating element 12. In general, the opening 35 can also be formed as an indentation for the arrangement of the extension rod 34 on the actuating element 12.

Two of the hinge pins 5 are present in the form of a rivet 36 connected to the hinge cup 4, wherein two of the hinge pins 5 are formed as a clip 37 connected to the hinge cup 4. The clip 37 forms the pivot pin 22 as well as a further hinge pin 38 for a further articulated lever 39. The pivot pin 22 can, however, in general also be formed via a rivet 36.

Figure 5B:
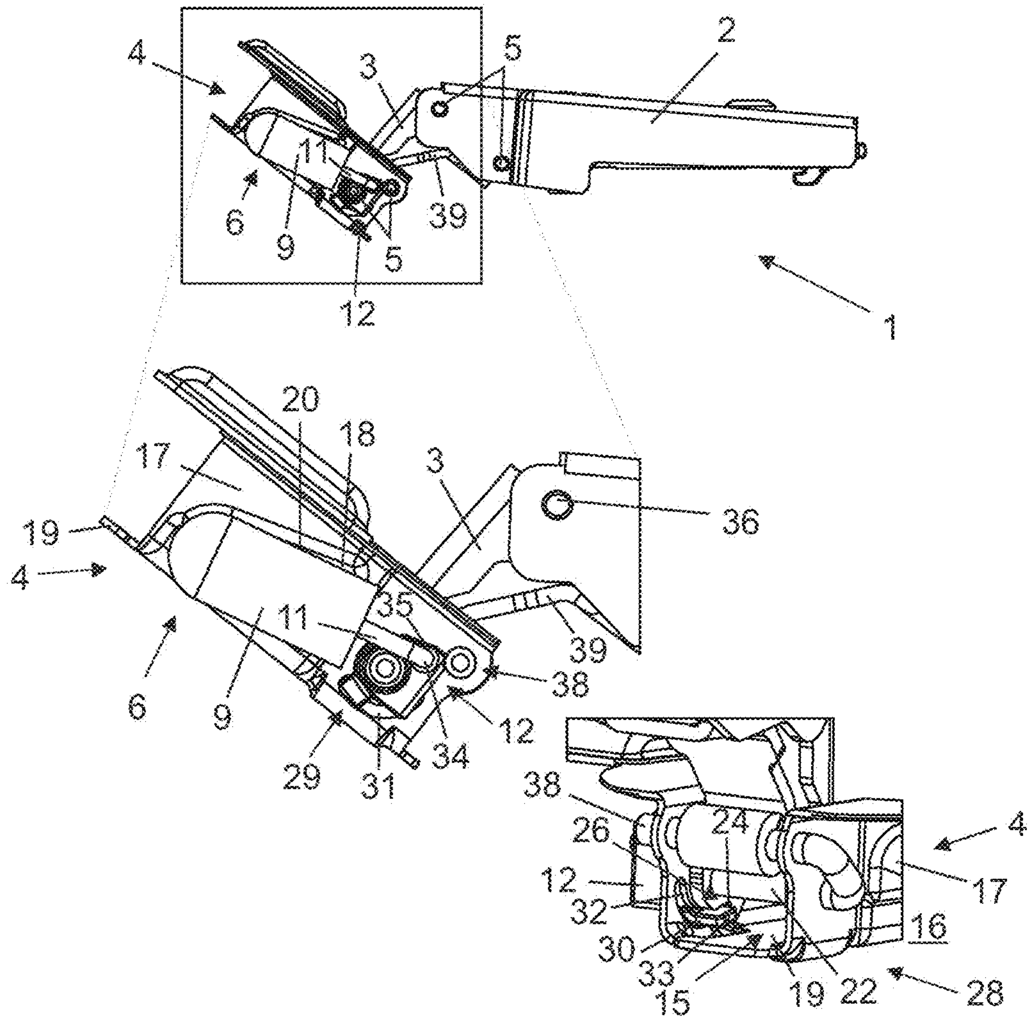

FIG. 5*b* shows that the articulated lever 3 comprises the transmission mechanism 26. In general, it is possible for the articulated lever 3 to be arrangeable on the actuating element 12 indirectly via the transmission mechanism 26 through a rotational movement of the articulated lever 3.

Figure 6A:
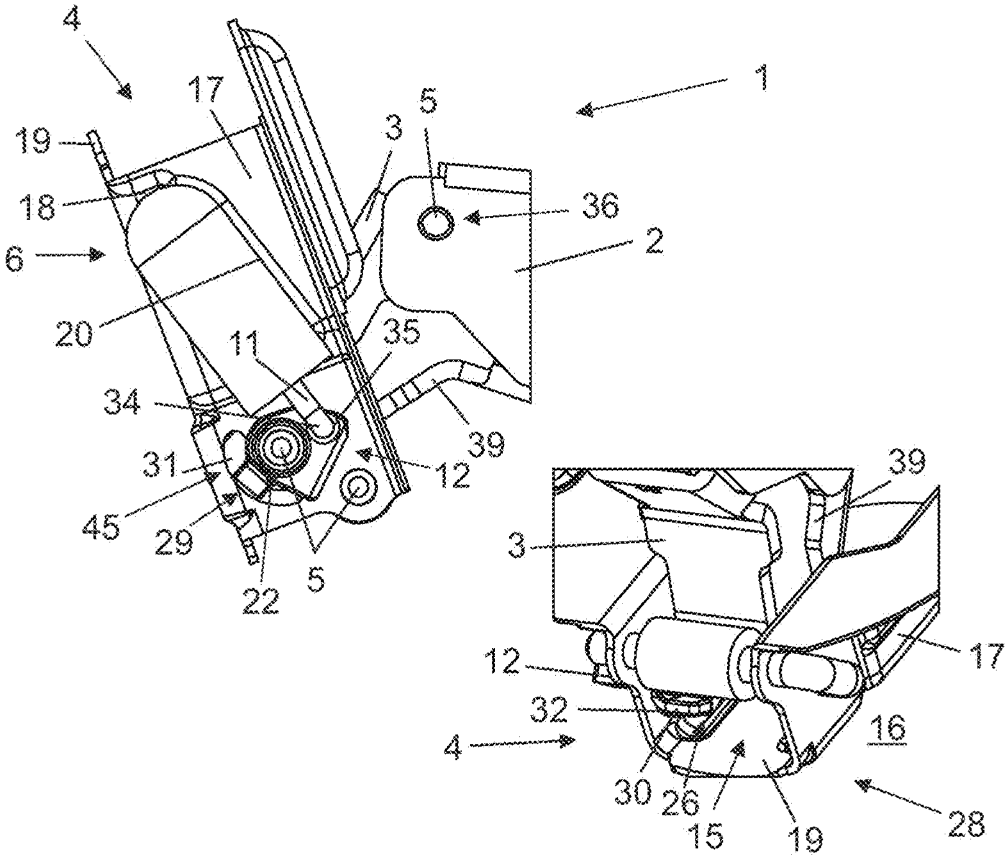
FIGS. 6*a*-6*b* show the hinge according to the embodiment according to FIG. 5*a* in two different positions between an open position and a closed position of the hinge, in each case in a view from the side and a perspective view.

FIG. 6*a* shows the hinge in the second movement portion 28, wherein a rotation of the articulated lever 3 is transferred to the actuating element 12 via the coupling mechanism 29 and, through the arrangement of the extension rod 34 in the opening 35, the piston rod 11 is moved translationally for the damping. In general, in the course of the damping, an overlapping of the linear movement with a rotation of the damping device 6 can be caused.

Figure 6B:
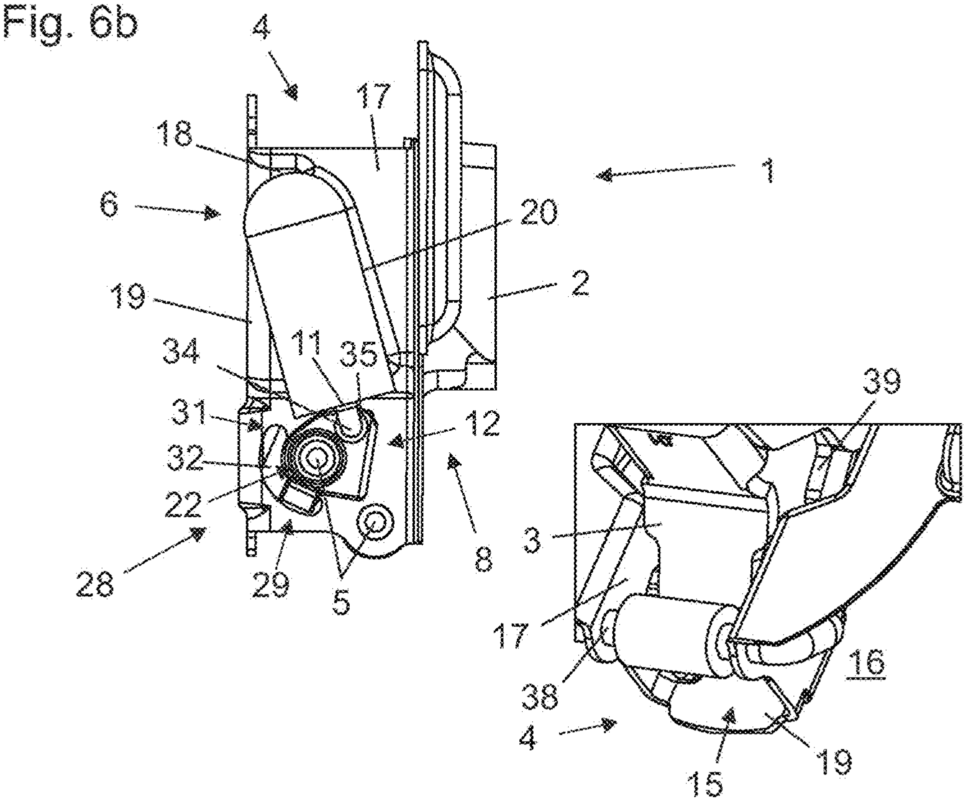

FIG. 6*b* differs from FIG. 6*a* merely to the effect that the hinge is in the closed position 8. An end of the damping stroke of the damping device 6 can for example be generated through a contacting of the articulated lever 3 with the hinge cup 4 and/or via a stop of the elongated hole 32.

Figure 7:
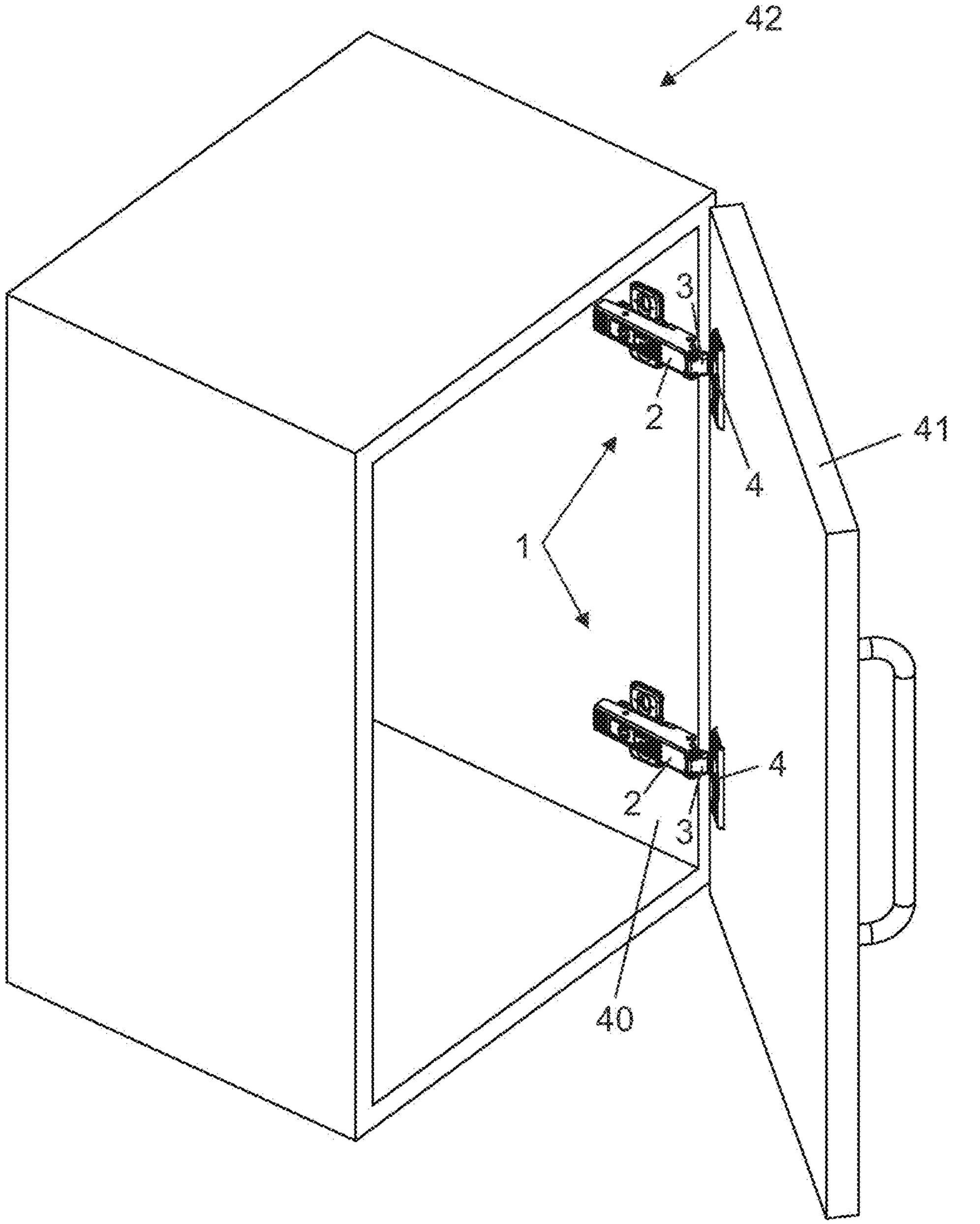
FIG. 7 shows a piece of furniture with two hinges for movably mounting a pivoting element of the piece of furniture.

FIG. 7 shows a piece of furniture 42 comprising a stationary furniture part 40 and a furniture part 41 with two hinges 1 movably mounted on the stationary furniture part 40, wherein the attachment part 2 of the hinge 1 is arranged on the stationary furniture part 40. The hinge cup 4 of the hinge 1 is arranged on the movable furniture part 41, wherein the hinge cup 4 is integrated in the movable furniture part 41.

The hinge 1 is, however, not limited to the use in pieces of furniture 42. The hinge 1 can for example also be used analogously in a window or a door.

The invention claimed is:

1. A hinge, in particular furniture hinge, comprising:

an attachment part configured to fasten the hinge to a stationary furniture part, an articulated lever, a hinge cup pivotably arranged on the attachment part via the articulated lever, wherein the articulated lever with the hinge cup is mounted via a hinge pin, wherein the hinge cup is configured to be fastened to a movable furniture part, a damping device configured to dampen a relative movement between the attachment part and the hinge cup between an open position and a closed position of the hinge, wherein the damping device comprises a linear damper including a piston and a translationally movable piston rod, and the damping device is arranged outside the hinge cup, an actuating element having a one-piece construction and configured to be spaced apart from the articulated lever in the open position, and configured to engage the piston rod to thereby actuate the damping device, and a transmission mechanism configured to transfer a rotational movement of the articulated lever to the actuating element, and wherein the actuating element is mounted rotatably on the hinge cup such that a first portion of the actuating element is located inside the hinge cup and a second portion of the actuating element is located outside the hinge cup, and the piston rod is movable substantially translationally with respect to the linear damper directly by a rotation of the actuating element, and wherein the transmission mechanism and the actuating element are configured such that, in a first movement portion starting from the open position in a direction toward the closed position, the transmission mechanism does not contact the actuating element, and, in a second movement portion following the first movement portion in the direction toward the closed position, the transmission mechanism contacts the actuating element.

2. The hinge according to claim 1, wherein the articulated lever is configured such that a first portion of the articulated lever is located inside the hinge cup, and a second portion of the articulated lever is located outside the hinge cup.

3. The hinge according to claim 1, further comprising a hinge cup cover configured to cover at least a portion of the damping device or the actuating element.

4. The hinge according to claim 3, wherein the hinge cup cover is configured to completely cover the damping device or the actuating element, and the hinge cup cover is configured to be clipped onto the hinge cup and comprises a receiving area corresponding to a shape of the damping device and/or of the actuating element.

5. The hinge according to claim 1, wherein the articulated lever and the hinge cup are configured such that, in the closed position or the open position of the hinge, a first portion of the articulated lever is arranged inside the hinge cup in an interior space of the hinge cup, and an exterior space of the hinge cup is separated from the interior space of the hinge cup by a hinge cup wall.

6. The hinge according to claim 5, wherein the exterior space of the hinge cup is separated from the interior space of the hinge cup by the hinge cup wall separate from a hinge cup cover and is at least partially spaced apart from the hinge cup cover.

7. The hinge according to claim 1, wherein the hinge cup comprises a cutout, a hinge cup base, and a support surface, the damping device being arranged at least partially in the cutout of the hinge cup or on the support surface of the hinge cup.

8. The hinge according to claim 7, wherein the support surface forms an acute angle with respect to the hinge cup base.

9. The hinge according to claim 1, wherein the actuating element projects through a hinge cup opening into the hinge cup, or the articulated lever projects through the hinge cup opening out of the hinge cup.

10. The hinge according to claim 1, wherein the actuating element is mounted on the hinge cup to be rotatable about the hinge pin, and a rotational movement of the actuating element is translated into a linear movement of the piston rod of the linear damper.

11. The hinge according to claim 10, wherein the actuating element comprises a control curve or a convex profiling in the direction of the piston of the linear damper.

12. The hinge according to claim 1, wherein the actuating element is formed as a sheet metal part or plastic part having a U-shape.

13. The hinge according to claim 1, wherein the transmission mechanism is arranged to be rotatable on the pivot pin, or is formed as an integral part of the articulated lever.

14. The hinge according to claim 1, wherein the transmission mechanism comprises a control curve or an undercut profile for receiving the actuating element.

15. The hinge according to claim 1, wherein the articulated lever comprises the transmission mechanism and engages the actuating element via the transmission mechanism through a rotational movement of the articulated lever.

16. The hinge according to claim 1, wherein the actuating element is arranged predominantly outside the hinge cup, or comprises a coupling mechanism configured to contact the transmission mechanism for damping the hinge.

17. The hinge according to claim 16, wherein the coupling mechanism is formed as a bar oriented substantially parallel to the hinge pin, wherein the bar protrudes transversely from the actuating element.

18. The hinge according to claim 16, wherein the coupling mechanism projects through an elongated hole shaped as an annular segment into the hinge cup, and the coupling mechanism has a free end.

19. The hinge according to claim 1, wherein the actuating element is connected to the piston rod.

20. The hinge according to claim 19, wherein the actuating element is connected to the piston rod via an extension rod arranged transverse or orthogonal to the piston rod, and at least a portion of the piston rod is arranged inside an opening or an indentation in the actuating element to allow the movement coupling of the piston rod to the actuating element.

21. The hinge according to claim 1, wherein the hinge pin is formed as a rivet connected to the hinge cup or as a clip connected to the hinge cup.

22. The hinge according to claim 21, wherein the hinge pin is formed as a clip connected to the hinge cup, the clip forming a further hinge pin for a second articulated lever.

23. A piece of furniture comprising:
a stationary furniture part;
a movably mounted furniture part; and
the hinge according to claim 1,
wherein the attachment part of the hinge is arranged on the stationary furniture part, and the hinge cup is integrated into portions of the movable furniture part.

24. The hinge according to claim 1, wherein the damping device is arranged completely outside the hinge cup.

25. The hinge according to claim 1, wherein the transmission mechanism is arranged inside the hinge cup.

26. The hinge according to claim 1, the transmission mechanism is configured to actuate the damping device exclusively in the second movement portion.

27. A hinge comprising:
an attachment part configured to fasten the hinge to a stationary furniture part,
an articulated lever,
a hinge cup pivotably arranged on the attachment part via the articulated lever, wherein the articulated lever with the hinge cup is mounted via a hinge pin, wherein the hinge cup is configured to be fastened to a movable furniture part,
a damping device configured to dampen a relative movement between the attachment part and the hinge cup between an open position and a closed position of the hinge, wherein the damping device comprises a linear damper including a piston and a translationally movable piston rod, and the damping device is arranged outside the hinge cup, and
an actuating element having a one-piece construction and configured to be spatially separate in the open position from the articulated lever, and configured to push the piston rod to thereby actuate the damping device,
wherein the actuating element is mounted rotatably on the hinge cup such that a first portion of the actuating element is located inside the hinge cup and a second portion of the actuating element is located outside the hinge cup, and the piston rod is movable substantially translationally with respect to the linear damper directly by a rotation of the actuating element,
wherein the actuating element is arranged predominantly outside the hinge cup, or comprises a coupling mechanism configured to contact the transmission mechanism for damping the hinge, and
wherein the coupling mechanism projects through an elongated hole shaped as an annular segment into the hinge cup, and the coupling mechanism has a free end.

28. A hinge comprising:
an attachment part configured to fasten the hinge to a stationary furniture part,
an articulated lever,
a hinge cup pivotably arranged on the attachment part via the articulated lever, wherein the articulated lever with the hinge cup is mounted via a hinge pin, wherein the hinge cup is configured to be fastened to a movable furniture part,
a damping device configured to dampen a relative movement between the attachment part and the hinge cup between an open position and a closed position of the hinge, wherein the damping device comprises a linear damper including a piston and a translationally movable piston rod, and the damping device is arranged outside the hinge cup, and
an actuating element having a one-piece construction and configured to be spatially separate in the open position from the articulated lever, and configured to push the piston rod to thereby actuate the damping device,
wherein the actuating element is mounted rotatably on the hinge cup such that a first portion of the actuating element is located inside the hinge cup and a second portion of the actuating element is located outside the hinge cup, and the piston rod is movable substantially translationally with respect to the linear damper directly by a rotation of the actuating element,
wherein the actuating element is connected to the piston rod via an extension rod arranged transverse or orthogonal to the piston rod, and at least a portion of the piston rod is arranged inside an opening or an indentation in the actuating element to allow the movement coupling of the piston rod to the actuating element.

* * * * *